(12) United States Patent
Bohnstedt

(10) Patent No.: US 7,425,387 B2
(45) Date of Patent: Sep. 16, 2008

(54) SEPARATOR FOR A LEAD STORAGE BATTERY

(75) Inventor: Werner Bohnstedt, Henstedt-Ulzburg (DE)

(73) Assignee: Daramic, Inc., Charlotte, NC (US)

( * ) Notice: Subject to any disclaimer, the term of this patent is extended or adjusted under 35 U.S.C. 154(b) by 214 days.

(21) Appl. No.: 10/566,928

(22) PCT Filed: Jul. 31, 2004

(86) PCT No.: PCT/EP2004/008620

§ 371 (c)(1),
(2), (4) Date: Jun. 12, 2006

(87) PCT Pub. No.: WO2005/015661

PCT Pub. Date: Feb. 17, 2005

(65) Prior Publication Data

US 2007/0128511 A1      Jun. 7, 2007

(30) Foreign Application Priority Data

Aug. 9, 2003   (EP) ................................. 03018203

(51) Int. Cl.
*H01M 2/18*   (2006.01)
(52) U.S. Cl. ....................................... 429/143; 428/167
(58) Field of Classification Search ................. 429/143; 428/167
See application file for complete search history.

(56) References Cited

U.S. PATENT DOCUMENTS

| | | | |
|---|---|---|---|
| 1,357,378 A * | 11/1920 | Boyer ........................ 429/143 |
| 3,351,495 A | 11/1967 | Larsen et al. |
| 3,895,982 A * | 7/1975 | Persson ................... 428/167 X |
| 4,927,722 A | 5/1990 | Bohnstedt et al. |
| 5,679,479 A | 10/1997 | Young et al. |
| 5,776,630 A | 7/1998 | Bohnstedt |
| 5,789,103 A | 8/1998 | Young et al. |
| 6,001,456 A * | 12/1999 | Newland ..................... 428/167 |
| 6,001,503 A * | 12/1999 | Hercamp et al. ......... 429/143 X |
| 6,335,079 B1 * | 1/2002 | Osawa et al. ............. 428/167 X |
| 6,410,183 B2 * | 6/2002 | Weerts et al. ................ 429/143 |
| 7,070,850 B2 * | 7/2006 | Dietz et al. ............. 428/167 X |

FOREIGN PATENT DOCUMENTS

| | | |
|---|---|---|
| EP | 0899801 A1 | 3/1999 |
| EP | 0994518 A1 | 4/2000 |
| JP | 2000-182593 | 6/2000 |
| WO | WO 00/63983 A1 | 10/2000 |
| WO | WO 01/13442 A1 | 2/2001 |

* cited by examiner

*Primary Examiner*—Stephen J. Kalafut
(74) *Attorney, Agent, or Firm*—Hammer & Associates, P.C.

(57) ABSTRACT

The invention relates to a separator made of elastic plastic and suitable for use in a lead storage battery, and consisting of sheet material with an inner region and two peripheral regions and having ribs running in the longitudinal direction on at least one side, the ribs in the inner region being more widely spaced than those in the peripheral region, characterized in that at least the first 3 ribs in the peripheral region that are adjacent to the inner region have a cross-section essentially in the form of a triangle projecting from the level of the sheet material, with the base of the triangle on the sheet material, one side of the triangle facing the inner region and the other side facing the periphery, the side facing the inner region being longer than that facing the periphery, and to a lead storage battery containing such separators.

19 Claims, 1 Drawing Sheet

SEPARATOR FOR A LEAD STORAGE BATTERY

DESCRIPTION

The invention relates to a separator made of elastic plastic and suitable for use in a lead storage battery, said separator consisting of sheet material with an inner region and two peripheral regions and having ribs running in the longitudinal direction on at least one side, the ribs in the inner region being more widely spaced than those in the peripheral regions, and to a lead battery containing such separators.

The separators currently used in lead batteries are microporous films of sheet material that prevent shorting between neighbouring electrode plates of opposite polarities and plate material from falling out, but on account of their porous structure permit ionic current flow in the electrolyte. Separators of this kind are known from, for example, U.S Pat. Nos. 3,351,495, 4,927,722, 5,776,630 and WO 01/13 442. Such separators are normally provided on at least one side with longitudinal ribs that are intended to prevent direct contact of the sheet material with the positive electrode plate. These ribs also lend the separator a certain rigidity in the longitudinal direction. Longitudinal ribs of this kind may also, as described in U.S Pat. Nos. 5,679,479 and 5,789,103, consist of a plurality of individual stamped embossments that form a rib structure of alternating ridges and furrows.

Separators are usually manufactured by extrusion of a thermoplastic into a film that is then rolled into a sheet material with the prescribed ribs, after which the pore former, such as mineral oil, is extracted and the sheet material so formed is wound into rolls. This sheet material is later drawn off the roll and cut into strips of the desired width. These strips are cut to the desired length and then folded over either a positive or a negative electrode plate to form a sheath, the two peripheral regions of which can be joined by, for example, heat sealing, pressure welding or other processes that are known per se. Electrode plates are then assembled into groups for a storage battery, plates in separator sheaths alternating with plates of opposite polarity without sheaths. In general, only electrode plates of a single polarity are placed in separator sheaths; in special cases, however, electrode plates of both polarities can be placed in separator sheaths. The electrode plates within a group are now aligned and then joined together. The alignment of the electrode plates may result in individual electrode plates being pushed to a greater or lesser extent into one or the other peripheral region of a separator sheath. Because the electrode plates frequently acquire pointed tips or sharp edges depending on the manufacturing process, this displacement can cause a point or edge of an electrode plate to puncture the sheet material, which in turn can result in shorting with the neighbouring electrode. This is especially the case when the electrode plates used consist of a grid of, for example, expanded metal, into which the actual active material is incorporated, as described for example in EP 0 994 518 A1. In such cases it may occur that the expanded material is not cut precisely at the nodes, so that individual grid wires project from the electrode plates, bend slightly on alignment of the electrode plates and puncture the sheet material of the separator.

To avoid, or at least reduce, the risk of puncture by the points, edges or grid wires of the electrode plates, it has been proposed previously that the peripheral region be designed as a plurality of parallel, concave furrows interspersing a plurality of similarly formed ribs (EP 0 899 801, JP 2000-182593) and that the ribs between the furrows be broader and with a flat upper surface (WO 00/63983). It has been shown, however, that in unfavourable cases it is still possible for individual separator sheaths to be punctured during alignment of the electrode plates, with the associated risk of shorting.

It is therefore the object of the present invention to further improve the separator of the latter type so as to further reduce the risk of the electrode plates puncturing the sheet material of the separator, and to provide a lead storage battery containing such separators.

This object is achieved for a separator made of elastic plastic and suitable for use in a lead storage battery, said separator consisting of sheet material with an inner region and two peripheral regions, and having ribs running in the longitudinal direction on at least one side, the ribs in the inner region being more widely spaced than those in the peripheral region, in that at least the first 3 ribs in the peripheral region that are adjacent to the inner region have a cross-section essentially in the form of a triangle projecting from the level of the sheet material, with the base of the triangle on the sheet material, one side of the triangle facing the inner region and the other side facing the periphery, the side facing the inner region being longer than that facing the periphery.

The side facing the inner region, which is longer than the side facing the periphery, moves away from the sheet material any electrode material that impinges on this inward-facing side during alignment, so that puncture of the sheet material can be effectively prevented.

It has proved particularly advantageous if the side facing the inner region is 1.5 to 15 times, preferably 2 to 6 times, and most preferably 2 to 4 times as long as the side facing the periphery. The ratio of the length of the two sides provides a particularly simple means of ensuring the deflection of the edge of the electrode plate, depending on its mechanical properties, away from the sheet material. Those skilled in the art can determine by simple experiment the length ratio that is particularly favourable for a given electrode plate.

It has also proved favourable for the side facing the inner region to enclose an angle of 5° to 40° with the base. With the electrode plates used today, an angle of 8° to 30° between the side facing the inner region and the base has proved most satisfactory.

A thickness of the sheet material in the range of 0.05 to 0.35 mm, particularly between 0.08 and 0.25 mm, has proved most satisfactory. It goes without saying that this thickness is measured between neighbouring ribs.

To increase the stability of the ribs in the peripheral region it has proved practical if the side facing the inner region makes an angle of 75° to 115° with the side facing the edge. An angle between 80° and 100° is optimal in many cases.

It is particularly advantageous if all the ribs in the peripheral region have the same cross-section.

In the normal case between 3 and 30 ribs per cm are present in the peripheral region, the upper edge of the ribs preferably being at a distance of 0.1 to 0.8 mm from the sheet material.

The object of the present invention is also a lead storage battery containing a plurality of electrodes arranged parallel to one another, neighbouring electrodes possessing opposite polarities and the electrodes of at least one polarity each being enclosed in a separator of the invention, said separator being folded into a sheath and joined at the edges of the peripheral regions.

The invention will now be described in more detail with the help of the following figures.

Figure 1:
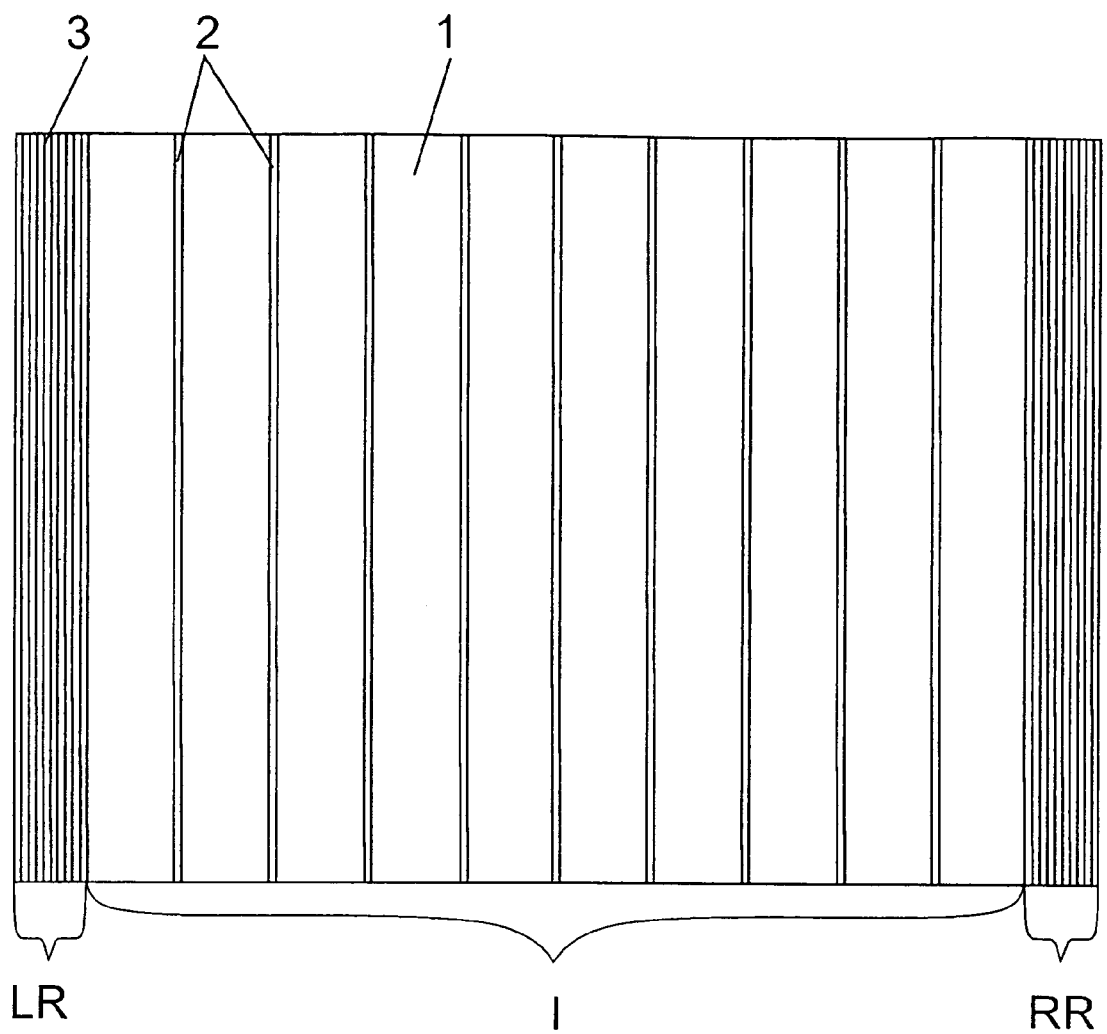
FIG. 1 shows a top view of a separator of the invention
Figure 2:
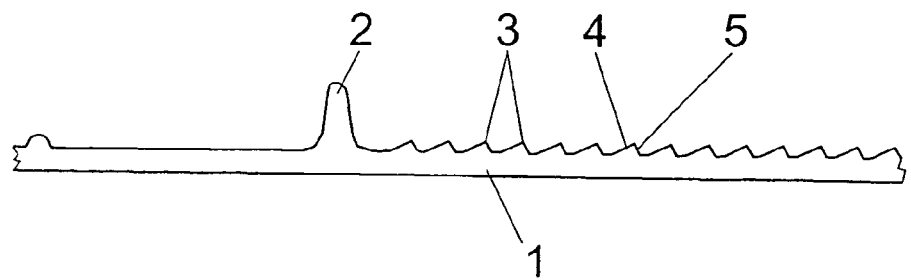
FIG. 2 is a cross-section of the region AA of FIG. 1.

The separator of FIG. 1 has an inner region 1 and right and left peripheral regions RR and LR respectively to the right and left of the inner region 1. Ribs 2 are located in the inner region, and ribs 3 in the two peripheral regions RR and LR, on the sheet material 1. The spacing between ribs 2 in the inner region is greater than that between ribs 3 in the peripheral region.

Separators of this kind are normally produced as continuous material, for example by extrusion, subsequent rolling, and extraction of the pore-forming mineral oil, and are then cut to length. Separators that have been cut to length are then each folded, with the fold running perpendicular to the ribs, around an electrode plate so as to form a sheath, the ribs shown in the figure then pointing towards each other in the case of a positive electrode plate and away from the electrode plate in the case of a negative electrode plate. To produce a sheath open at the top, the two faces of the folded separator are joined together at the left- and right-hand edges.

A magnified view of AA of FIG. 1 also shows the rib 2 of the inner region that lies closest to the edge. Following this rib 2 is a plurality of ribs 3 of the peripheral region, each of which has an essentially triangular cross-section, the triangle having a base (not shown) on the sheet material 1 and two sides 4 and 5, with side 4, facing the inner region, being longer than side 5, facing the periphery.

The invention claimed is:

1. A separator made of elastic plastic and suitable for use in a lead storage battery, said separator consisting of sheet material with an inner region and two peripheral regions, and having ribs running in the longitudinal direction on at least one side, the ribs in the inner region being more widely spaced than those in the peripheral regions, characterized in that at least the first 3 ribs in the peripheral regions that are adjacent to the inner region have a cross-section essentially in the form of a triangle projecting from the level of the sheet material, with the base of the triangle on the sheet material, one side of the triangle facing the inner region and the other side facing the periphery, the side facing the inner region being longer than that facing the periphery.

2. Separator according to claim 1, characterized in that the side of the triangle facing the inner region is 1.5 to 15 times as long as the side facing the periphery.

3. Separator according to claim 1, characterized in that the side facing the inner region encloses an angle of 5° to 40° with the base.

4. Separator according to claim 1, characterized in that the side facing the inner region encloses an angle of 75° to 115° with the side facing the periphery.

5. Separator according to claim 1, characterized in that the sheet material has a thickness of 0.05 to 0.35 mm.

6. Separator according to claim 1, characterized in that all the ribs in the peripheral regions have the same cross-section.

7. Separator according to claim 1, characterized in that 3 to 30 ribs per cm are located in the peripheral regions.

8. Lead storage battery containing a plurality of electrodes arranged parallel to one another, neighboring electrodes possessing opposite polarities and the electrodes of at least one polarity each being enclosed in a separator in accordance with claim 1 that has been folded into a sheath and joined at the edges of the peripheral regions.

9. Separator according to claim 2 characterized in that the side facing the inner region encloses an angle of 5° to 40° with the base.

10. Separator according to claim 2, characterized in that the side facing the inner region encloses an angle of 75° to 115° with the side facing the periphery.

11. Separator according to claim 3, characterized in that the side facing the inner region encloses an angle of 75° to 115° with the side facing the periphery.

12. Separator according to claim 3, characterized in that the sheet material has a thickness of 0.05 to 0.35 mm.

13. Separator according to claim 4, characterized in that the sheet material has a thickness of 0.05 to 0.35 mm.

14. Separator according to claim 4, characterized in that all the ribs in the peripheral regions have the same cross-section.

15. Separator according to claim 5, characterized in that all the ribs in the peripheral regions have the same cross-section.

16. Separator according to claim 5, characterized in that 3 to 30 ribs per cm are located in the peripheral regions.

17. Separator according to claim 6, characterized in that 3 to 30 ribs per cm are located in the peripheral regions.

18. Lead storage battery containing a plurality of electrodes arranged parallel to one another, neighboring electrodes possessing opposite polarities and the electrodes of at least one polarity each being enclosed in a separator in accordance with claim 2 that has been folded into a sheath and joined at the edges of the peripheral regions.

19. Lead storage battery containing a plurality of electrodes arranged parallel to one another, neighboring electrodes possessing opposite polarities and the electrodes of at least one polarity each being enclosed in a separator in accordance with claim 7 that has been folded into a sheath and joined at the edges of the peripheral regions.

* * * * *